United States Patent
McNulty et al.

(10) Patent No.: US 7,820,022 B2
(45) Date of Patent: Oct. 26, 2010

(54) PHOTOELECTROCHEMICAL CELL AND METHOD OF MANUFACTURE

(75) Inventors: Thomas Francis McNulty, Ballston Lake, NY (US); Lifeng Zhang, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1069 days.

(21) Appl. No.: 11/287,599

(22) Filed: Nov. 28, 2005

(65) Prior Publication Data

US 2007/0119706 A1    May 31, 2007

(51) Int. Cl.
*C25B 1/04*    (2006.01)

(52) U.S. Cl. .................. 204/248; 204/242; 205/340

(58) Field of Classification Search .......... 205/340; 204/248
See application file for complete search history.

(56) References Cited

U.S. PATENT DOCUMENTS

| | | | |
|---|---|---|---|
| 3,925,212 A | 12/1975 | Tchernev | |
| 3,976,505 A | 8/1976 | Farrington et al. | |
| 4,090,933 A | 5/1978 | Nozik | |
| 4,094,751 A | 6/1978 | Nozik | |
| 4,247,499 A | 1/1981 | Glugla et al. | |
| 4,252,629 A | 2/1981 | Bewer et al. | |
| 4,381,978 A | 5/1983 | Gratzel et al. | |
| 4,400,451 A | 8/1983 | Gordon | |
| 4,405,424 A | 9/1983 | Graetzel et al. | |
| 4,466,869 A | 8/1984 | Ayers | |
| 4,484,992 A | 11/1984 | Buhler et al. | |
| 4,524,091 A | 6/1985 | Blaauw et al. | |
| 4,610,766 A | 9/1986 | Kolts et al. | |
| 4,643,817 A | 2/1987 | Appleby | |
| 4,793,910 A | 12/1988 | Smotkin et al. | |
| 5,281,496 A | 1/1994 | Clarke | |
| 5,350,644 A | 9/1994 | Graetzel et al. | |
| 5,525,440 A | 6/1996 | Kay et al. | |
| 5,616,366 A | 4/1997 | Olsen et al. | |
| 5,622,791 A | 4/1997 | Shackle | |
| 5,780,380 A * | 7/1998 | Endoh et al. | 502/300 |
| 5,919,726 A | 7/1999 | Hatano et al. | |
| 6,060,026 A * | 5/2000 | Goldstein | 422/186 |
| 6,221,530 B1 | 4/2001 | Turner et al. | |
| 6,280,700 B1 | 8/2001 | Nishii et al. | |
| 6,335,480 B1 | 1/2002 | Bach et al. | |
| 6,409,893 B1 | 6/2002 | Holzbock et al. | |
| 6,586,271 B2 | 7/2003 | Hanoka | |
| 6,652,904 B1 | 11/2003 | Phani et al. | |
| 6,669,827 B2 | 12/2003 | Austin | |

(Continued)

*Primary Examiner*—Harry D Wilkins, III
(74) *Attorney, Agent, or Firm*—Paul J. DiConza

(57) ABSTRACT

A photoelectrochemical cell may include a cell housing defining an interior volume with a window affixed to the cell housing for allowing the passage of light into the interior volume of the cell. A polymeric film may be affixed within the interior volume defining an anterior compartment and a posterior compartment within the cell housing. A plurality of semiconductor particles embedded continuously within a through thickness of the polymeric film so that a first respective surface area of the plurality of semiconductor particles is exposed to the anterior portion of the cell and a second respective surface area of the plurality of semiconductor particles is exposed to the posterior portion of the cell. The membrane may be immersed within an electrolyte so that incident radiation on the semiconductor particles causes oxidation and reduction to occur within the cell to produce gaseous hydrogen and oxygen.

20 Claims, 2 Drawing Sheets

U.S. PATENT DOCUMENTS

| | | |
|---|---|---|
| 6,720,202 B2 | 4/2004 | Wang |
| 6,814,802 B2 | 11/2004 | Wallace, Jr. |
| 6,881,604 B2 | 4/2005 | Lindstrom et al. |
| 6,936,143 B1 | 8/2005 | Graetzel et al. |
| 2004/0262154 A1 | 12/2004 | Gibson et al. |
| 2005/0194041 A1 | 9/2005 | Fan et al. |
| 2005/0196596 A1 | 9/2005 | Salafsky |
| 2005/0205128 A1 | 9/2005 | Deng et al. |

\* cited by examiner

PHOTOELECTROCHEMICAL CELL AND METHOD OF MANUFACTURE

FIELD OF THE INVENTION

This invention relates generally to an apparatus for producing hydrogen directly from solar energy. More particularly, this invention relates to hydrogen production using a photoelectrochemical cell having a particulate-loaded thermoplastic film membrane within an interior cavity of the cell.

BACKGROUND OF THE INVENTION

Various configurations of photoelectrochemical (PEC) cells are known in the art with the fundamental objective of converting light energy into chemical energy in the form of hydrogen. One such configuration uses a single photo anode and a metal counter electrode immersed in an aqueous electrolyte for the electrolysis of water. When light is incident on the semiconductor electrode, it absorbs part of the light and generates electricity. This electricity is then used for the electrolysis of water.

PEC cells may use various types of thin film semiconducting materials that are photoactive and which may be fabricated using numerous techniques. For instance, U.S. Pat. No. 4,524,091 discloses numerous techniques for fabricating semiconducting photo anodes including a method of preparing thick film $TiO_2$ photo anodes. The thick film photo anodes are prepared from a paste consisting of a $TiO_2$ powder dispersed in a liquid organic vehicle. The thick film is screen-printed and fired on a ceramic substrate, e.g. of 96% alumina. A layer of screen-printed thick film conductor is also provided as a conducting path to a counter electrode in the PEC cell.

BRIEF DESCRIPTION OF THE INVENTION

Embodiments of the present invention allow for fabricating a particulate-loaded membrane within a PEC cell. The membrane may have photoelectrochemical particles embedded continuously through the thickness of the membrane so that a first surface area of the particles is exposed on a first side of the membrane and a second surface area of the particles is exposed on a second side of the membrane.

The PEC cell may include a housing that defines an interior volume within which an electrolyte may be contained. A window may be integral to the housing for allowing the passage of incident radiation into the interior volume. The membrane may be affixed within the housing whereby the absorption of incident radiation by the photoelectrochemical particles when immersed within the electrolyte causes oxidation within a first portion of the electrolyte and reduction within a second portion of electrolyte.

DETAILED DESCRIPTION OF THE INVENTION

Certain photoelectrochemical (PEC) cells may employ particulate matter, such as various semiconducting powders or particles suspended in an electrolyte. In this type of cell, hydrogen and oxygen may be developed in the same electrolyte, which leads to inefficiency as well as the need to separate the gases. Embodiments of the invention allow for manufacturing a PEC cell having a particulate-loaded membrane, which allows for hydrogen and oxygen to be evolved from water within segregated compartments of the PEC cell.

Figure 1:
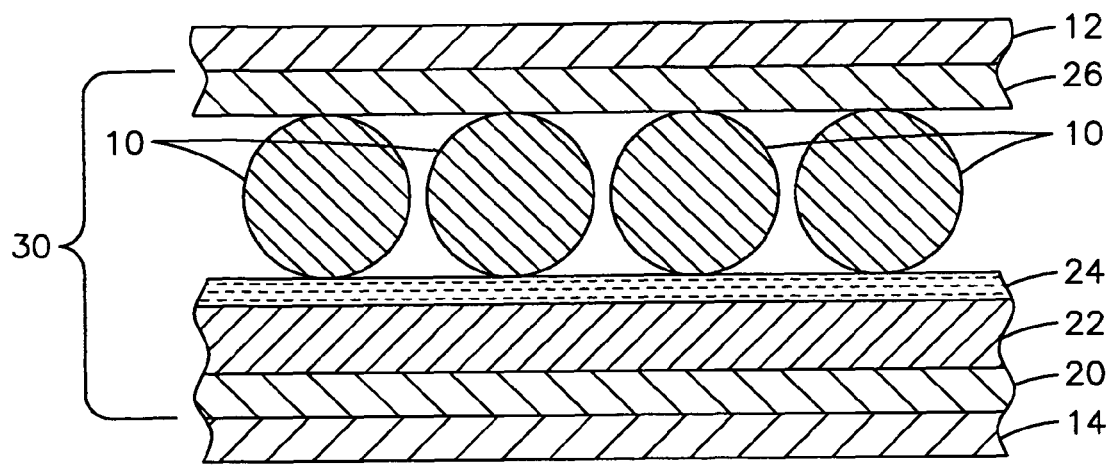
FIG. 1 is a schematic cross section of constituents for forming a particulate-loaded membrane.

Embodiments of the invention allow for a monolayer of PEC particles to be embedded in a thermoplastic or polymeric film with the particles continuous in the through thickness direction of the film. FIG. 1 illustrates a plurality of PEC particles 10 positioned between an upper presser plate 12 and a lower presser plate 14. Plates 12, 14 may be part of a conventional device for heating and pressing material. A first layer of metal foil 20 may be placed over the lower pressure plate 14 with a layer of polymer film 22 on top of first layer 20. An adhering layer 24 of tackifying solution or agent may be applied over an upper surface area of polymer film 22. PEC particles 10 may be applied to the adhering layer 24 with a second layer of metal foil 26 between an upper surface of particles 10 and upper presser plate 12. Plates 12, 14, first and second layers 20, 26, film 22, adhering layer 24 and particles 10 may be referred to herein collectively as a stack 30.

Stack 30 may be formed in part by placing metal foil 20 on lower pressure plate 14. Metal foil 20 may be any suitable material, such as aluminum foil that allows sufficient heat transfer from lower presser plate 14 while preventing polymer film 22 from melting beyond acceptable limits. Polymer film 22 may be placed over metal layer 20. Film 22 may be a thermoplastic-based polyethylene or polypropylene, for example, or similar material that is stable under solar radiation while in the presence of either caustic or acidic materials such as electrolytes KOH and HCl, respectively. Embodiments may include polymer films 22 having saturated bonds, which significantly diminish photodegradation of the film.

Adhering layer 24 may be applied on polymer film 22 so that a plurality of PEC particles 10 may adhere thereto. This allows for securing PEC particles 10 in place so that stack 30 may be pressed between upper and lower plates 12, 14. Layer 24 may be any suitable tackifying solution or agent such as a curable epoxy liquid or diluted rubber cement. In an embodiment, it may be desirable to apply adhering layer 24 to a thickness, such as approximately one-tenth the mean diameter of a plurality of PEC particles 10, for example, that allows for one PEC particle 10 to adhere to polymer film 22 per unit area. This allows for applying a monolayer of PEC particles 10 on the surface of polymer film 22 as part of stack 30. Adhering layer 24 may be applied to greater or lesser thicknesses depending on the specific application.

In an embodiment, a monolayer of PEC particles 10 may be powder particles selected from groups of n-type or p-type photo electrode semiconductor materials that are effective photoelectrochemical materials in accordance with aspects of the invention. For example, the PEC particles 10 may be selected for the production of hydrogen by splitting $H_2O$ molecules. The size and morphology of such PEC particles 10 may be selected so that agglomeration is inhibited when being applied to adhering layer 24. This allows for achieving a relatively uniform monolayer of particles across polymer film 22 when forming stack 30 for hot pressing. PEC particles 10 may be selected to be nominally or quasi-spherical so that the particles are continuous through polymer film 22 after hot pressing stack 30.

Figure 2:
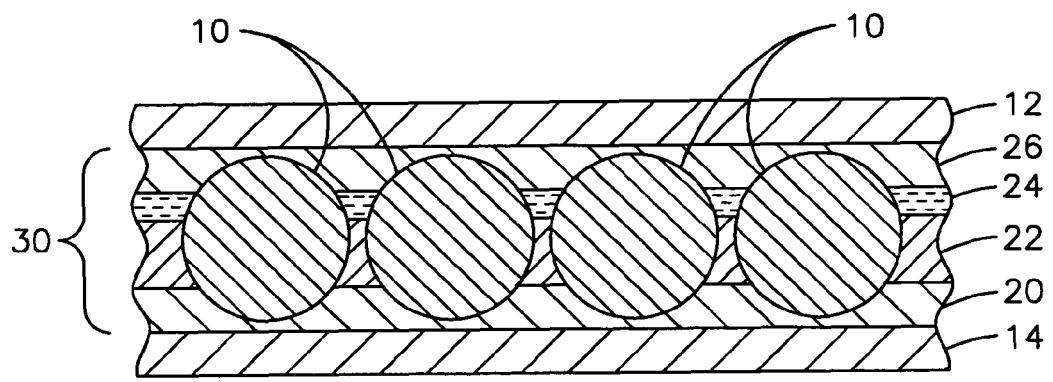
FIG. 2 is a schematic cross section of the constituents of FIG. 1 after being compressed.

The second layer of metal foil 26 may be placed over the monolayer of PEC particles 10 after they are applied to polymer film 22 via adhering layer 24 to form stack 30. Stack 30 may be hot pressed between plates 12, 14 by conventional means at a predetermined temperature and pressure selected to embed PEC particles 10 within polymer film 22 so the particles are continuous through the film. FIG. 2 illustrates stack 30 compressed by plates 12, 14. Stack 30 may be pressed by plates 12, 14 at a temperature that is above the glass transition temperature of polymer film 12. It will be appreciated that the temperature and pressure at which stack 30 is pressed may depend on the glass transition temperature as well as other melt properties of film 12.

The pressure exerted by plates 12, 14 may be sufficient to force PEC particles 10 through polymer film 12 so that the particles are embedded continuously through the through thickness of film 12. This allows for a first surface of an embedded PEC particle 10 to be exposed on a first side of film 12 and a second surface of that PEC particle 10 to be exposed on a second side of film 12. First and second layers of metal foil 20, 26 may be sufficiently deformable so that as stack 30 is pressed PEC particles 10 will be pressed into the foil as shown in FIG. 2. Upon cooling of stack 30 after pressing, the foil layers 20, 26 may be removed thereby exposing respective surfaces of PEC particles 10 on either surface of polymer film 22. Remnants of adhering layer 24 may be cleaned or washed away with a solvent.

It will be appreciated that the constituents of stack 30 may be arranged in different relationships prior to stack 30 being hot pressed. For example, stack 30 may be arranged with the first layer of metal foil 20 placed on lower presser plate 14. Metal foil 20 may be coated with adhering layer 24, which may be covered with PEC particles 10. Adhering layer 24 may be applied to a thickness that allows for one monolayer of PEC particles 10 to adhere to metal foil 20. The particle coated metal foil 24 may be covered with polymer film 22, which is subsequently covered by the second layer of metal foil 26. This stack 30 is then pressed between presser plates 12, 14.

Figure 3:
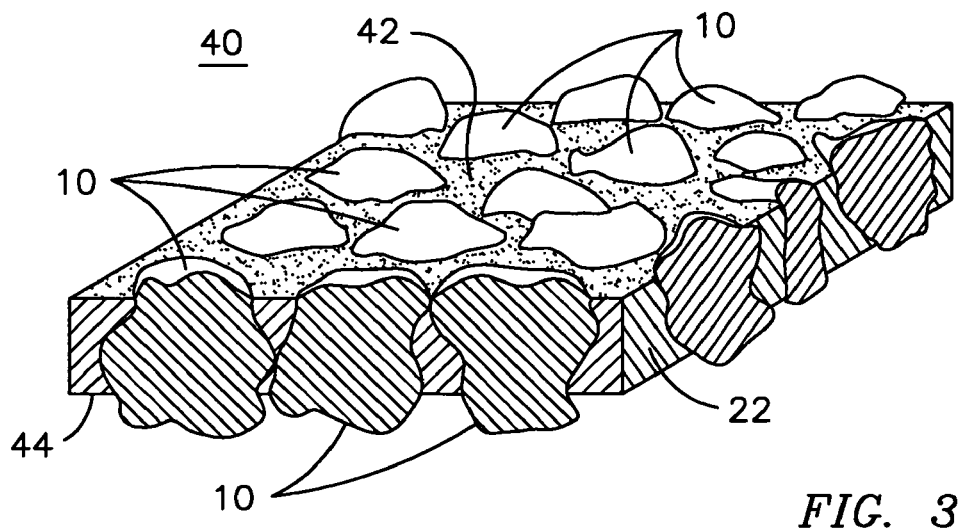
FIG. 3 is a schematic cross section of a particulate-loaded membrane.

FIG. 3 illustrates a cross section of an exemplary particulate-loaded membrane 40 having a plurality of PEC particles 10 embedded within a through thickness of polymer film 22. Membrane 40 is formed so that a first respective surface area of each PEC particle 10 is exposed on a first side 42 of membrane 40 and a second respective surface area of each PEC particle 10 is exposed on a second side 44 of membrane 40. PEC particles 10 may be embedded within membrane 40 to maximize the respective surface areas of PEC particles 10 exposed on the first and second sides 42, 44 of membrane 40. Alternate embodiments allow for these respective surface areas to be optimized depending on the specific application of membrane 40.

Figure 4:
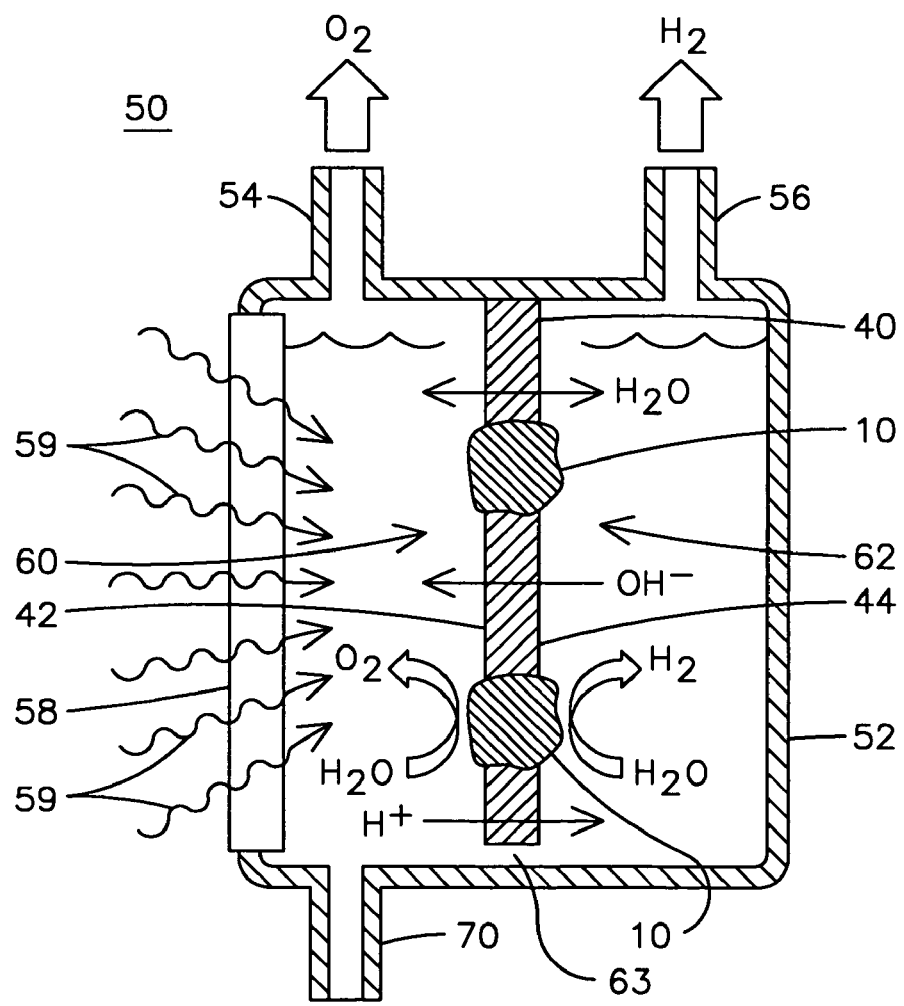
FIG. 4 is a schematic cross section of an exemplary photoelectrochemical cell with the particulate-loaded membrane of FIG. 3 affixed therein.

FIG. 4 illustrates a cross section of an exemplary PEC cell 50 that may be used for the reduction/oxidation of water to produce hydrogen and oxygen. PEC cell 50 may include a housing 52 formed from conventional materials. A first discharge port 54 and a second discharge port 56 may extend from housing 52 for discharging and capturing oxygen and hydrogen, respectively. A window 58 made of glass or other suitable material may form one side of housing 52, which allows for the passage of light 59 into the interior volume of the housing.

In an embodiment, a single particulate-loaded membrane 40 may be positioned or affixed within the interior of housing 52 to partition the housing into an anterior compartment 60 and a posterior compartment 62 of approximately proportionate volumes. Compartments 60, 62 may be formed to disproportionate sizes depending on the specific application or for optimizing performance of PEC cell 50. While housing 52 is shown substantially rectangular it may take on other shapes as desired. Regardless of the shape, a particulate-loaded membrane 40 may be fitted within housing 52 to divide its interior into compartments 60, 62.

One or more vias 63 may be formed within membrane 40 to connect compartments 60, 62 and complete a chemical circuit within PEC cell 50. Vias 63 may be formed in any suitable location to establish the circuit and in an embodiment may be formed near the bottom membrane 50, with reference to FIG. 4, to minimize or inhibit cross contamination of hydrogen with oxygen and vice versa. Membrane 40 may be positioned within housing 52 to form via 63 rather than forming it within the membrane. For example, membrane 40 may be affixed within housing 52 so that a portion or portions of membrane 40 is spaced sufficiently away from housing 52. Vias 63 formed within membrane 40 and the spacing of membrane 40 away from housing 52 may be used either alone or in combination.

For ease of illustration, membrane 40 is shown in FIG. 4 having two PEC particles 10 embedded therein it being appreciated that in practice a plurality of PEC particles 10 would be embedded within membrane 40. In an embodiment, the respective surface area of PEC particles 10 exposed on first and second sides 42, 44 of membrane 40 may be maximized such as when membrane 40 is used for splitting water into hydrogen and oxygen within PEC cell 50. Cell 50 may include an inlet port 70 for allowing an electrolyte composed of water to enter compartment 60. The electrolyte entering PEC cell 50 may be any suitable electrolyte and may be selected as a function of the photocatalytic properties of PEC particles 10 embedded within polymer film 22. For example, in an embodiment of PEC cell 50 the electrolyte may be simple saltwater, or it may be KOH or NaOH.

Embodiments of the invention allow for PEC particles 10 to be $TiO_2$, $SrTiO_3$, $TaON$, $Ta_3N_5$, $SrTaO_2N$, $CaTaO_2N$, $SiC$, $GaN$ and $LuTaON_2$ powder particles, for example, or other powder particles suitable for producing hydrogen under photoelectrochemical principals. Using such particles in lieu of conventional ceramic thin film materials provides a significant cost savings for the production of hydrogen over traditional PEC cells. Embedding PEC particles 10 within membrane 40 as powder particles also allows for using a greater range of materials relative to conventional thin film processes. This also allows for manufacturing PEC cells 50 with at least one particulate-loaded membrane 40 as a flat panel of sufficiently large surface area for the absorption of light to produce hydrogen.

In an embodiment, a plurality of $TiO_2$ powder particles of approximately 50-100 microns in diameter may be coated on a "dead-soft" layer 20 of aluminum foil, i.e., annealed for maximum ductility, of approximately 25 microns thick. A diluted rubber cement may be used for adhering the plurality of particles to layer 20. A sheet of polyethylene film 22 of approximately 15 microns thick may be placed over the plurality of particles 10 with a second sheet of aluminum foil of approximately 25 microns thick over polyethylene film 22 to form a stack 30. A stack 30 having an area of approximately 0.5 $in^2$ may be pressed at approximately 10,000 lb/ft at approximately 175° F. for approximately five minutes to form a membrane 40. It will be appreciated that varying pressures, temperatures and pressing duration may be used as a function of the area and composition of stack 30 and/or its individual constituents.

FIG. 4 illustrates that particulate-loaded membrane 40 divides housing 52 into anterior compartment 60 and posterior compartment 62. Anterior compartment 60 is exposed to sunlight passing through window 58 while posterior compartment 62 remains dark, i.e., sunlight does not pass through membrane 40 to illuminate posterior compartment 62. This configuration allows for the surface area of PEC particles 10 exposed within anterior compartment 60 on the first side 42 of membrane 40 to absorb photons and generate electron-hole pairs, as illustrated schematically in FIG. 4. The holes carry out the oxidation of water to oxygen and $H^+$ ions, while the electrons reduce the $H^+$ ions to $H_2$ in gaseous form.

In this respect, the hydrogen-generating surface of membrane 40 is separate from the oxygen-generating surface of membrane 40 within PEC cell 50. The surface area of PEC particles 10 exposed within anterior compartment 60 and/or posterior compartment 62 may be coated with an electrode material, i.e., an electron-transfer catalyst to improve efficiency of PEC cell 50. For example, Pt, Ni, hydrogenase and/or oxygenase materials, for example, may be used as a coating on the respective surfaces of PEC particles 10. The respective surfaces may be completely or partially coated taking into account practical limitations of coating techniques and performance objectives of a PEC cell 50. It will be appreciated that these materials may be coated on the respective surfaces of PEC particles 10 and/or mixed with an electrolyte with embodiments of PEC cell 50.

PEC particles 10 may be powder particles selected from various n-type and p-type inorganic semiconductor materials, as well as other materials that perform photoelectrochemistry within PEC cell 50. For example, PEC particles 10 may be selected based on the properties of: 1) bandgap greater than the 1.23 eV required to photoelectrochemically-split water; 2) valence band and conduction band/Fermi level being favorably aligned with the reduction/oxidation potentials of water; 3) good carrier properties, i.e., high carrier concentration, good carrier mobility/lifetime; and 4) stability within an electrolyte.

If an n-type semiconductor material is embedded within membrane 40 the $O_2$ will be formed in the anterior compartment 60 and $H_2$ in the posterior compartment 62. Conversely, if a p-type semiconductor material is embedded within membrane 40 the $H_2$ will be formed in the anterior compartment 60 and $O_2$ in the posterior compartment 62. In either case, the $H_2$ and $O_2$ produced may exit housing 52 through respective discharge ports 54, 56 and collected using conventional techniques.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. An apparatus for producing hydrogen, the apparatus comprising:
   a housing defining an interior volume;
   a window integral to the housing allowing the passage of incident radiation into the interior volume;
   an opaque membrane having a first side and a second side affixed within the housing, wherein the membrane divides the interior volume defined by the housing into an anterior compartment exposed to incident light passing through the window, and a posterior compartment, wherein the membrane prevents incident light from passing into the posterior compartment; and
   a plurality of photoelectrochemical particles embedded within the opaque membrane, wherein individual particles of the plurality of photoelectrochemical particles have a first surface area exposed to the anterior compartment on the first side of the opaque membrane and a second surface area exposed to the posterior compartment on the second side of the opaque membrane.

2. The apparatus of claim 1, the photoelectrochemical particles comprising a powder selected from the group of powder particles comprising $TiO_2$, $SrTiO_3$, TaON, $Ta_3N_5$, $SrTaO_2N$, $CaTaO_2N$, SiC, GaN and $LuTaON_2$.

3. The apparatus of claim 1, the photoelectrochemical particles comprising an n-type semiconductor powder.

4. The apparatus of claim 1, the photoelectrochemical particles comprising a p-type semiconductor powder.

5. The apparatus of claim 1 further comprising the opaque membrane partitioning the interior volume into an anterior compartment and a posterior compartment.

6. The apparatus of claim 5, the photoelectrochemical particles comprising an n-type semiconductor powder whereby $O_2$ is formed within the anterior compartment and $H_2$ is formed within the posterior compartment.

7. The apparatus of claim 5, the photoelectrochemical particles comprising a p-type semiconductor powder whereby $H_2$ is formed within the anterior compartment and $O_2$ is formed within the posterior compartment.

8. The apparatus of claim 6 further comprising a coating of an electron-transfer catalyst on at least a portion a surface area of the photoelectrical particles exposed to the posterior compartment.

9. The apparatus of claim 1, the opaque membrane comprising a polymeric material.

10. The apparatus of claim 1 further comprising at least one via formed within the membrane establishing a chemical circuit between the first portion of electrolyte and the second portion of electrolyte.

11. The apparatus of claim 1 further comprising a coating of an electron-transfer catalyst on at least one surface area of the photoelectrochemical particles selected from the first surface area and the second surface area.

12. The apparatus of claim 11, the coating of an electron-transfer catalyst comprising a catalyst selected from the group of catalysts comprising Pt, Ni, a hydrogenase and an oxygenase.

13. A photoelectrochemical cell comprising:
   a cell housing defining an interior volume;
   a window affixed to the cell housing;
   an opaque polymeric film affixed within the interior volume defining an anterior compartment and a posterior compartment within the cell housing, wherein the polymeric film prevents incident light from passing into the posterior compartment; and
   a plurality of semiconductor particles embedded continuously within a through thickness of the opaque polymeric film, wherein individual of the plurality of semiconductor particles has a first surface area exposed to the anterior compartment and a second surface area exposed to the posterior compartment.

14. The photoelectrochemical cell of claim 13, the semiconductor particles comprising an n-type semiconductor powder.

15. The photoelectrochemical cell of claim 13, the semiconductor particles comprising a p-type semiconductor powder.

16. The photoelectrochemical cell of claim 13, the semiconductor particles comprising a powder selected from the group of powder particles comprising $TiO_2$, $SrTiO_3$, TaON, $Ta_3N_5$, $SrTaO_2N$, $CaTaO_2N$, SiC, GaN and $LuTaON_2$.

17. The photoelectrochemical cell of claim 13 further comprising a coating of an electron-transfer catalyst on at least one surface area of the semiconductor particles selected from the first surface area and the second surface area.

18. The apparatus of claim 17, the coating of an electron-transfer catalyst comprising a catalyst selected from the group of catalysts comprising Pt, Ni, a hydrogenase and an oxygenase.

19. The apparatus of claim 13 further comprising at least one via formed within the polymer film.

20. The apparatus of claim 13 further comprising the semiconductor particles comprising an n-type semiconductor powder whereby $O_2$ is formed within the anterior compartment and $H_2$ is formed within the posterior compartment.

* * * * *

UNITED STATES PATENT AND TRADEMARK OFFICE
CERTIFICATE OF CORRECTION

| | |
|---|---|
| PATENT NO. | : 7,820,022 B2 |
| APPLICATION NO. | : 11/287599 |
| DATED | : October 26, 2010 |
| INVENTOR(S) | : McNulty et al. |

It is certified that error appears in the above-identified patent and that said Letters Patent is hereby corrected as shown below:

In Column 7, Line 5, in Claim 18, delete "apparatus" and insert -- photoelectrochemical cell --, therefor.

In Column 8, Line 1, in Claim 19, delete "apparatus" and insert -- photoelectrochemical cell --, therefor.

In Column 8, Line 3, in Claim 20, delete "apparatus" and insert -- photoelectrochemical cell --, therefor.

Signed and Sealed this
Tenth Day of May, 2011

David J. Kappos
*Director of the United States Patent and Trademark Office*